US 12,207,090 B2

United States Patent
Lee et al.

(10) Patent No.: US 12,207,090 B2
(45) Date of Patent: Jan. 21, 2025

(54) MANAGEMENT SERVER, TERMINAL, AND METHOD FOR PROVIDING AND APPLYING WIRELESS LAN SECURITY POLICY BY PARTICIPATING IN MULTIPLE ACCESS POINTS

(71) Applicant: ELECTRONICS AND TELECOMMUNICATIONS RESEARCH INSTITUTE, Daejeon (KR)

(72) Inventors: Hyung Kyu Lee, Daejeon (KR); Ki Won Kim, Daejeon (KR); Byeong Sik Kim, Daejeon (KR); Hea Sook Park, Daejeon (KR); Yoon Sik Yoo, Daejeon (KR); Jong Kuk Lee, Daejeon (KR); Jin Hyuk Yim, Daejeon (KR); Ki Cheol Jeon, Daejeon (KR); Boo Geum Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 370 days.

(21) Appl. No.: 17/833,968

(22) Filed: Jun. 7, 2022

(65) Prior Publication Data

US 2023/0146970 A1 May 11, 2023

(30) Foreign Application Priority Data

Nov. 5, 2021 (KR) .......................... 10-2021-0151601

(51) Int. Cl.
*H04W 12/08* (2021.01)
*H04W 4/02* (2018.01)
(Continued)

(52) U.S. Cl.
CPC .......... *H04W 12/08* (2013.01); *H04W 4/023* (2013.01); *H04W 12/069* (2021.01); *H04W 48/16* (2013.01); *H04W 64/00* (2013.01)

(58) Field of Classification Search
CPC ..... H04W 84/12; H04W 48/16; H04W 48/20; H04W 88/08; H04W 28/18;
(Continued)

(56) References Cited

U.S. PATENT DOCUMENTS 8,199,729 B2   6/2012   Koo et al.
9,642,070 B2   5/2017   Kang et al.
(Continued)

FOREIGN PATENT DOCUMENTS

KR   20090045200 A      5/2009
KR   20130070270 A      6/2013
KR   10-2021-0032133 A  3/2021

*Primary Examiner* — Kwasi Karikari
(74) *Attorney, Agent, or Firm* — Rabin & Berdo, P.C.

(57) ABSTRACT

Provided is a method in which a management server provides wireless LAN security policy by participating in multiple APs. The method includes a step of receiving terminal information of a terminal, which is acquired in a process of scanning broadcasting information of multiple APs, from each of the multiple APs, a step of issuing and storing a token for opening a wireless LAN data channel to each of the multiple APs on the basis of reception time points of the terminal information, a step of receiving a token request for opening a wireless LAN data channel to an AP to be accessed, selected by a terminal among the multiple APs, and a step of distributing, to the terminal, a token of the AP to be accessed corresponding to the token request.

12 Claims, 3 Drawing Sheets

(51) Int. Cl.
*H04W 12/069* (2021.01)
*H04W 48/16* (2009.01)
*H04W 64/00* (2009.01)

(58) Field of Classification Search
CPC . H04W 52/245; H04W 92/18; H04W 12/062; H04W 12/08; H04W 36/0038; H04W 40/246; H04W 52/0206; H04W 72/542
See application file for complete search history.

(56) References Cited

U.S. PATENT DOCUMENTS

| | | |
|---|---|---|
| 2012/0134339 A1* | 5/2012 | Joe .................... H04W 12/062 370/331 |
| 2017/0171833 A1* | 6/2017 | Vamaraju ............. H04W 48/16 |
| 2018/0376395 A1 | 12/2018 | Gu |
| 2019/0246349 A1 | 8/2019 | Xing |
| 2019/0261303 A1* | 8/2019 | Wei .................... H04W 64/00 |

* cited by examiner

MANAGEMENT SERVER, TERMINAL, AND METHOD FOR PROVIDING AND APPLYING WIRELESS LAN SECURITY POLICY BY PARTICIPATING IN MULTIPLE ACCESS POINTS

CROSS-REFERENCE TO RELATED APPLICATION

This application claims priority to and the benefit of Korean Patent Application No. 10-2021-0151601, filed on Nov. 5, 2021, the disclosure of which is incorporated herein by reference in its entirety.

BACKGROUND

1. Technical Field

The present disclosure relates to a management server, a terminal, and a method for providing and applying wireless LAN security policy by participating in multiple access points (APs).

2. Related Art

A wireless LAN has many security problems because anyone may physically access the wireless LAN due to the characteristics of radio frequencies.

An initial security technology for wireless LAN access control has been developed starting with a wired equivalent protection (WEP) protocol for providing the same security level as wired LAN access control due to the characteristics of radio frequencies. The WEP protocol is a kind of encryption protocol that enables all users who have a key used for WEP for wireless LAN access permission to use wireless LAN.

Thereafter, in order to provide wireless LAN security through individual user authentication, a Wi-Fi protected access (WPA) technology and the like combined with a user authentication-based 802.1x wireless LAN authentication technology have been standardized.

However, even though the wireless LAN authentication technology is used, it is not possible to solve vulnerability due to a malicious rouge AP. A wireless LAN intrusion prevention technology and the like for preventing the rouge AP are still required.

Korean Patent Application Laid-Open No. 10-2014-0091903 (Jul. 23, 2014)

SUMMARY

Various embodiments are directed to providing a management server, a terminal, and a method for providing and applying wireless LAN security policy by participating in multiple APs, which allows a terminal to access a wireless LAN only in a specific area through information exchange between the terminal and multiple APs in order for the terminal to access an AP.

However, the problems to be solved by the present disclosure are not limited to the above-described problems, and other problems may be present.

A terminal for applying wireless LAN security policy by participating in multiple APs in accordance with a first aspect of the present disclosure includes: a communication module configured to transmit/receive data to/from multiple APs having overlapping coverage areas and a management server that manages the multiple APs; a memory configured to store a program for wireless access to any one of the multiple APs; and a processor configured to scan broadcasting information of the multiple APs to acquire radio frequency information and network identification information of the multiple APs, by executing the program stored in the memory, to measure distances from the multiple APs, and to wirelessly access an AP to be accessed located at the shortest distance, wherein when a token requested for opening a wireless LAN data channel to the AP to be accessed is received through the management server, the processor requests access to the wireless LAN data channel of the AP to be accessed, on the basis of the received token.

A management server for providing wireless LAN security policy by participating in multiple APs in accordance with a second aspect of the present disclosure includes: a communication module configured to transmit/receive data to/from multiple APs having overlapping coverage areas and a terminal for wirelessly accessing any one of the multiple APs; a memory configured to store a control program for wireless access of the terminal to any one of the multiple APs; and a processor configured to issue and store a token for opening a wireless LAN data channel to each of the multiple APs on the basis of reception time points of terminal information transmitted from the multiple APs, by executing the program stored in the memory, and to, upon receiving a token request for opening a wireless LAN data channel to an AP to be accessed, selected by a terminal among the multiple APs, distribute, to the terminal, a token of the AP to be accessed corresponding to the token request, wherein the terminal requests access to a wireless LAN data channel of the AP to be accessed, on the basis of the token.

A method for providing wireless LAN security policy by participating in multiple APs in accordance with a third aspect of the present disclosure includes: a step of receiving terminal information of a terminal, which is acquired in a process of scanning broadcasting information of multiple APs, from each of the multiple APs; a step of issuing and storing a token for opening a wireless LAN data channel to each of the multiple APs on the basis of reception time points of the terminal information; a step of receiving a token request for opening a wireless LAN data channel to an AP to be accessed, selected by a terminal among the multiple APs; and a step of distributing, to the terminal, a token of the AP to be accessed corresponding to the token request.

In order to solve the above-described problems, a computer program in accordance with another aspect of the present disclosure is coupled to a computer as hardware, executes the management server, the terminal, and the method for providing and applying wireless LAN security policy by participating in multiple APs, and is stored in a computer readable recording medium.

The other details of the present disclosure are included in the detailed descriptions and the drawings.

In accordance with an embodiment of the present disclosure described above, even though user's confidential information for wireless LAN access is exposed, when participation in a multiple AP negotiation process based on a specific area is not possible, wireless LAN access may be disabled.

Furthermore, there is an advantage in that the existing wireless LAN standard protocol and security mechanism can be easily integrated and applied only by installing additional software without modifying the existing wireless LAN standard protocol and security mechanism.

Such an embodiment of the present disclosure does not provide wireless LAN access to all terminals in a frequency range in a situation in which the introduction of wireless LAN into major national facilities and public institutions is restricted due to the vulnerability of wireless LAN security, and reinforces security by providing wireless LAN access to a terminal which exists only in a specific area, thereby significantly contributing to improving the security of the existing wireless LAN infrastructure.

The effects of the present disclosure are not limited to the above-mentioned effects, and the other effects which are not mentioned herein will be clearly understood from the following descriptions by those skilled in the art.

DETAILED DESCRIPTION

The advantages and characteristics of the present disclosure and a method for achieving the advantages and characteristics will be clearly understood through embodiments to be described in detail together with the accompanying drawings. However, the present disclosure is not limited to the following embodiments, but may be implemented in various shapes different from each other, and the present embodiments are provided to bring the disclosure of the present disclosure to perfection and assist those skilled in the art to completely understand the scope of the present disclosure. Therefore, the present disclosure is defined only by the scope of the appended claims.

Terms used in the present specification are used for describing embodiments, not limiting the present disclosure. The terms of a singular form in the present specification may include plural forms unless specifically mentioned. The meaning of 'comprise' and 'comprising' used in the specification does not exclude the presence or addition of one or more other components in addition to the mentioned components. Throughout the specification, like reference numerals represent the same components, and the term "and/or" includes each of mentioned components and one or more combinations thereof. Although terms "first" and "second" are used to describe various components, the components are not limited by the terms. The terms are used only to distinguish one element from another element. Therefore, a first component described below may be a second component within the technical idea of the present disclosure.

Unless defined differently, all terms (including technical and scientific terms) used in this specification may be used as meanings which may be commonly understood by those skilled in the art to which the present disclosure pertains. Furthermore, terms which are defined in generally used dictionaries are not ideally or excessively construed unless clearly and specifically defined.

Figure 1:
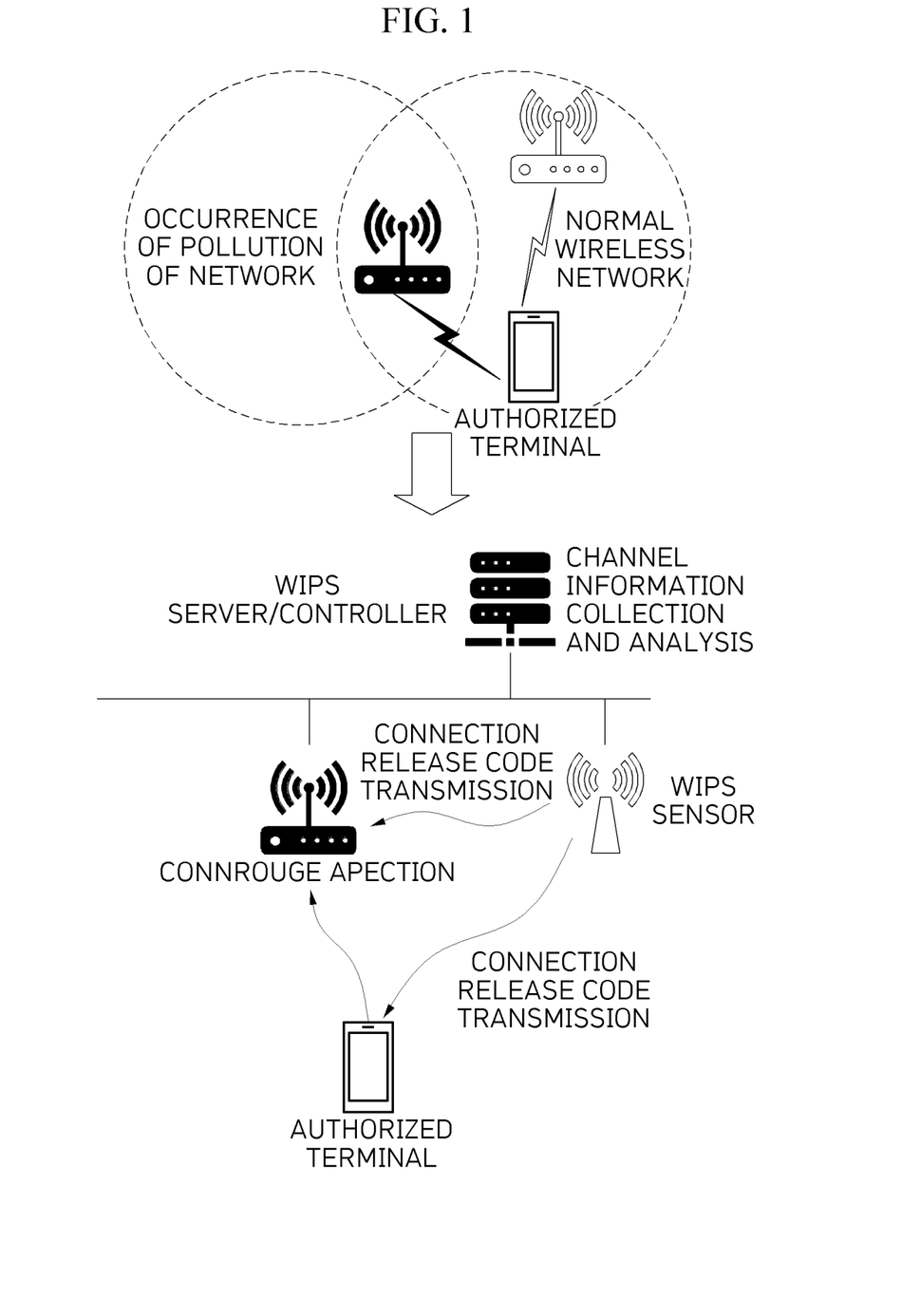
FIG. 1 is a diagram for explaining a security threat by a rouge AP and a WIPS operation concept in the related art.

FIG. 1 is a diagram for explaining a security threat by a rouge AP and a WIPS operation concept in the related art.

Referring to FIG. 1, even though a wireless LAN authentication technology is powerful, confidential information and the like used for wireless LAN authentication of users may be stolen through a rouge AP due to the characteristics of radio frequencies. Accordingly, a wireless LAN intrusion prevention technology (WIPS) serves to detect a rouge AP through a sensor device for detecting the rouge access point (AP).

However, when a sensor detection range and the like are physically limited or a new wireless LAN standard and the like are introduced, a previously installed sensor may not detect the existence of a rouge AP, or even through the sensor detects the rouge AP, all vulnerabilities may not be solved. Furthermore, there is a disadvantage in that it is not possible to guarantee timely connection interruption so that a normal user does not access the rouge AP.

In addition, a wireless LAN access technology has a standard service structure in which a terminal selects an accessible AP (or SSID) by using broadcasting information of an AP and is connected to a specific AP through a management and control frame on the basis of the selected AP. An access method in a basic service set (BSS) or an extended service set (ESS) of a wireless LAN service is a representative example.

In such an environment, the WIPS technology acquires and analyzes management and control frame information of an 802.11 standard MAC layer protocol, which is transmitted/received between a terminal and an AP, and prevents an unregistered rouge AP from operating.

However, since a wireless connection determined as a rouge AP is blocked through the 802.11 protocol, all neighboring normal wireless LAN APs not actually managed by the WIPS may also be determined as rouge APs and may not be used.

Accordingly, there are many problems caused by the use of the WIPS, such as severe inconvenience which occurs because facilities or homes having constructed the wireless LAN service close to an actual WIPS operation area do not use a wireless LAN service.

In order to solve such problems, a management server, a terminal, and a method for providing and applying wireless LAN security policy by participating in multiple APs in accordance with an embodiment of the present disclosure provide a control procedure for allowing a terminal to access a wireless LAN only in a specific area through information exchange between the terminal and multiple APs on the basis of an IEEE 802.11 standard technology. That is, the management server, the terminal, and the method provides an advantage in that a specific security area may be operated by allowing only a terminal to access the wireless LAN, the terminal existing at a specific location and capable of negotiating a connection with the multiple APs to access the wireless LAN.

The management server, the terminal, and the method are easily integrated with an existing wireless LAN standard technology and have an advantage of providing a wireless LAN security infrastructure tolerant to exposure of wireless LAN confidential information.

Particularly, in an embodiment of the present disclosure, a non-association protocol such as fine timing measurement (FTM) developed in an IEEE 802.11-2016 standard is used in a negotiation process with multiple APs. That is, when the round trip time of a radio signal between a terminal and an AP is accurately measured using an FTM protocol and the terminal obtains the round trip time based on the FTM protocol, information on distance from each AP having performed the FTM may be calculated. In an embodiment of the present disclosure, a terminal may use the distance information and determine an access request to an AP located at the nearest distance even in situation in which overlapping APs exist.

Hereinafter, a terminal 100 and a management server 200 for applying and providing wireless LAN security policy by participating in multiple APs in accordance with an embodiment of the present disclosure will be described with reference to FIG. 2 and FIG. 3.

Figure 2:
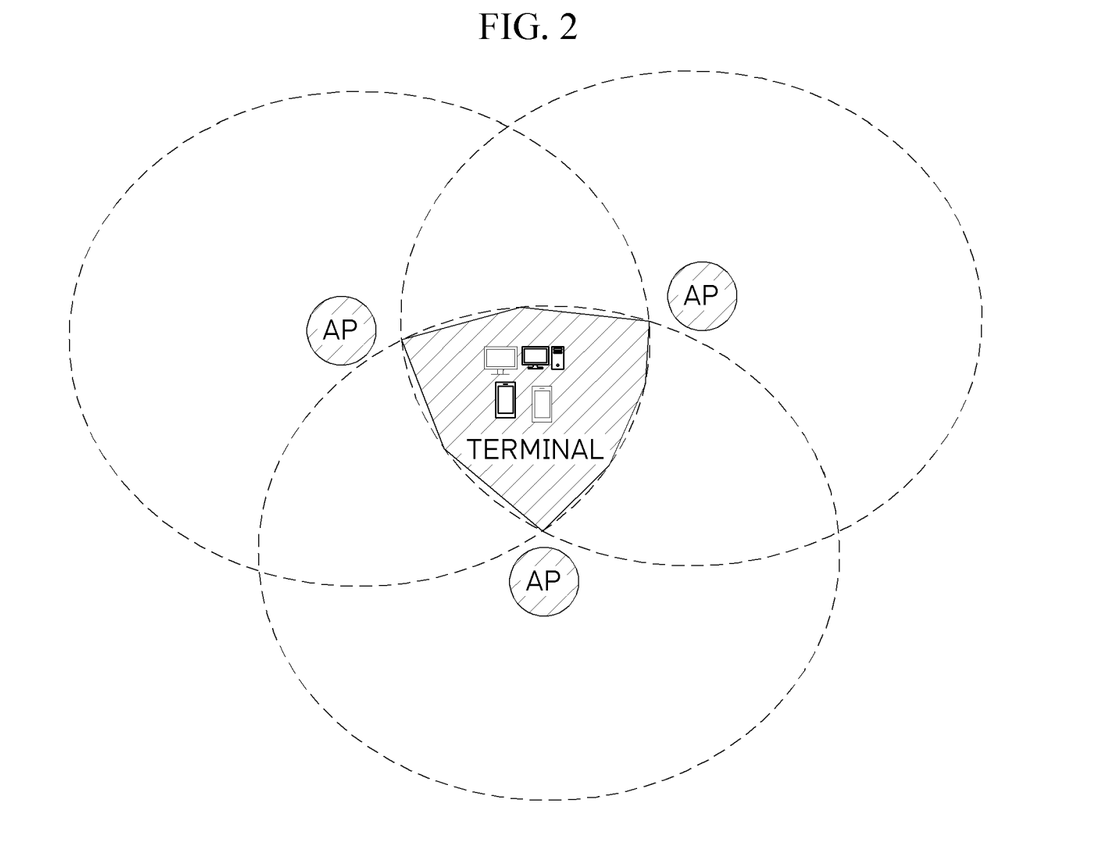
FIG. 2 is a diagram for explaining a construction environment of a wireless LAN service area in the present disclosure.
Figure 3:
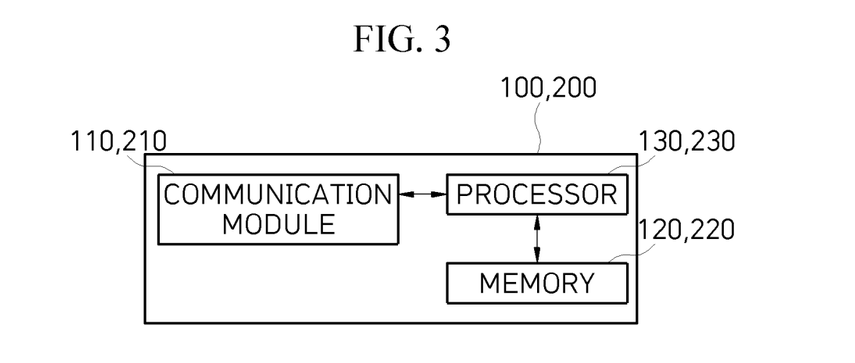
FIG. 3 is a block diagram of a terminal and a management server in accordance with an embodiment of the present disclosure.

FIG. 2 is a diagram for explaining a construction environment of a wireless LAN service area in the present disclosure, and FIG. 3 is a block diagram of the terminal 100 and the management server 200 in accordance with an embodiment of the present disclosure.

In general, a wireless LAN has a service set identifier (SSID). In the present disclosure, one wireless LAN service may be managed by allocating one SSID to a plurality of APs 300.

In an embodiment of the present disclosure, in order for the terminal 100 to access one SSID, multiple APs 300 are configured with overlapping coverage areas as illustrated in FIG. 2. Furthermore, service nodes include an agent of the terminal 100, APs, and the management server 200 for authentication and access control of the terminal 100.

In an embodiment of the present disclosure, the terminal 100 includes a communication module 110, a memory 120, and a processor 130.

The communication module 110 transmits/receives data to/from the multiple APs 300 having overlapping coverage areas and the management server 200 that manages the multiple APs 300.

The memory 120 stores a program for wireless access to any one of the multiple APs 300, and the processor 130 executes the program stored in the memory 120.

Furthermore, in an embodiment of the present disclosure, the management server 200 includes a communication module 210, a memory 220, and a processor 230.

The communication module 210 transmits/receives data to/from the multiple APs 300 and the terminal 100, the memory 220 stores a control program for wireless access to any one of the multiple APs 300, and the processor 230 executes the program stored in the memory 220.

Hereinafter, contents of detailed operations performed by the terminal 100 and the management server 200 described above will be described with reference to FIG. 4.

Figure 4:
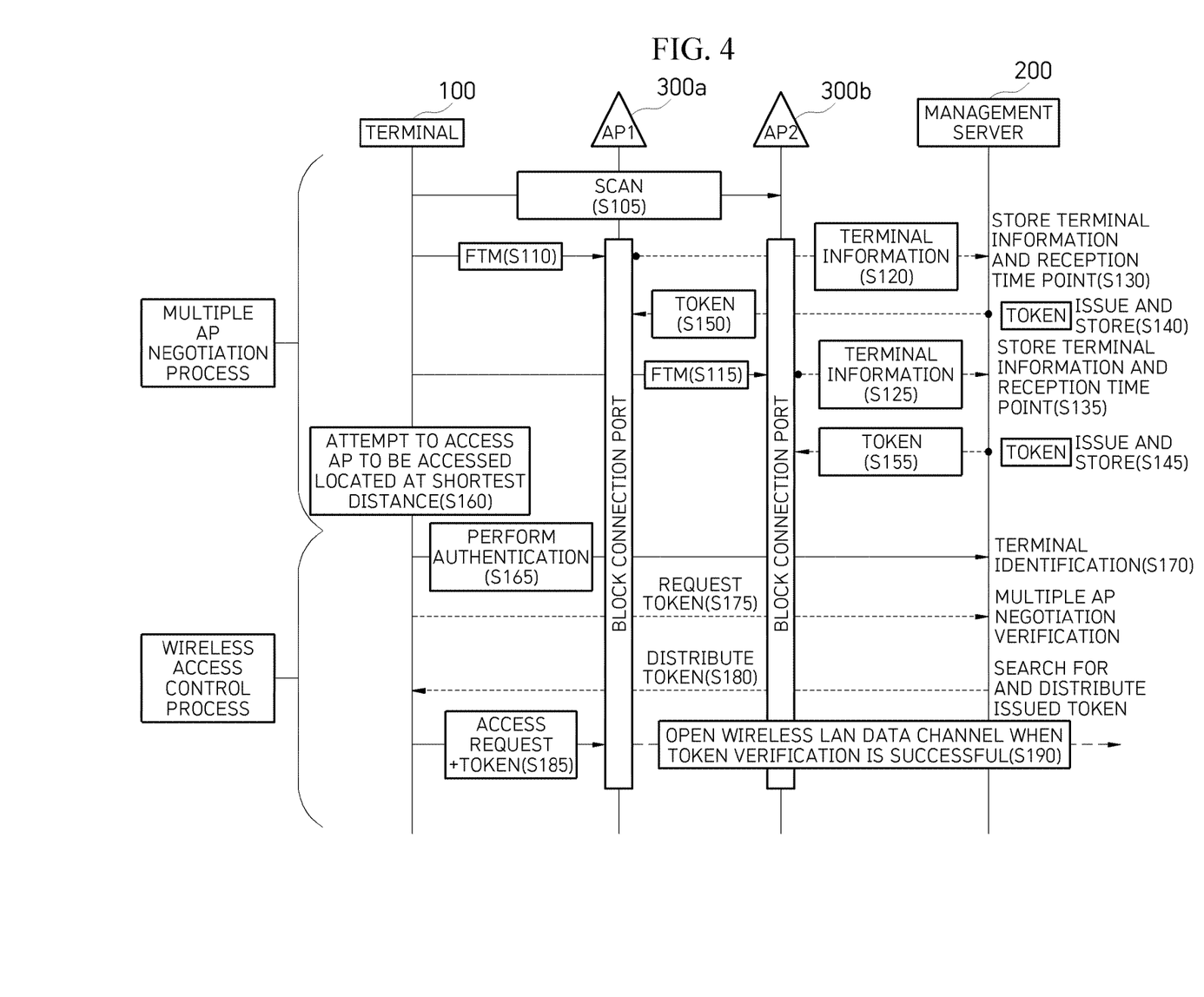
FIG. 4 is a flowchart of a method for providing wireless LAN security policy in accordance with an embodiment of the present disclosure.

FIG. 4 is a flowchart of a method for providing wireless LAN security policy in accordance with an embodiment of the present disclosure.

As illustrated in FIG. 4, the method for providing wireless LAN security policy in accordance with an embodiment of the present disclosure roughly includes a multiple AP negotiation process and a wireless access control process.

First, the management server 200 may determine in advance a list of a plurality of APs 300, which will participate in the multiple AP negotiation process, on the basis of overlapping coverage areas of the multiple APs 300 managed based on the same SSID for SSID-based access control. For convenience of description, FIG. 4 illustrates that the terminal 100 performs the multiple AP negotiation process with two APs 300a and 300b; however, the present disclosure is not limited thereto and the number of APs may be variously applied according to embodiments. That is, in an example of the present disclosure, for convenience of description, the two APs 300a and 300b among a plurality of APs managed based on the same SSID perform the multiple AP negotiation process with the terminal 100, which may be determined according to policy.

On the other hand, all of the plurality of APs managed based on the same SSID do not need to participate in the multiple AP negotiation process, and when it is checked that the multiple AP negotiation process between a preset number of APs and the terminal 100 has been performed, the management server 200 may recognize that the multiple AP negotiation process has been completed and issue a token to the terminal 100 upon subsequent authentication and token request. For example, in a case where there are five APs managed based on the same SSID, when the terminal 100 has performed the multiple AP negotiation process with more than half of APs, the management server 200 may check that the terminal 100 has completed the multiple AP negotiation process, and then issue a token. In such a case, the number of APs that perform the multiple AP negotiation process with the terminal 100 may be determined on the basis of availability of a wireless LAN, and a participation target AP is not limited to a specific AP, and may be determined in consideration of the location of the terminal 100 and availability, or may also be determined randomly.

The multiple AP negotiation process starts with the terminal 100 scanning broadcasting information of the plurality of APs 300a and 300b installed around the terminal 100 (S105).

In an embodiment, as a result of the scan, the terminal 100 may acquire radio frequency information and network identification information of multiple APs including SSIDs of neighboring APs and an MAC address, channel information, bandwidth information, and signal strength of an AP belonging to the SSID.

Through this, the terminal 100 may check MAC addresses of neighboring APs 300a and 300b belonging to an SSID to be accessed, and identify the checked APs 300a and 300b as APs 300a and 300b that will perform the multiple AP negotiation process. Furthermore, each AP information acquired through the scan result is used as information for executing the FTM protocol to be described below, together with wireless interface information of the terminal 100 (hereinafter, terminal information).

Next, the terminal 100 measures distances from the APs 300a and 300b (S110 and S115), selects an AP located at the shortest distance as an AP to be accessed, and attempts wireless access (S160).

For example, in an embodiment of the present disclosure, when the terminal 100 sequentially executes the FTM protocol with the neighboring APs 300a and 300b through FTM protocol execution information, the terminal 100 may measure the round trip time between the terminal 100 and each AP, and calculate information on distance between the neighboring APs 300a and 300b having executed the FTM protocol and the terminal 100 on the basis of the round trip time. Since the FTM protocol operates independently of an 802.11 association process, there is an advantage in that it can be easily integrated with the procedure of the present disclosure.

As the FTM protocol is executed, each of the APs 300a and 300b acquires terminal information through the FTM protocol. Such terminal information includes the MAC address of the terminal 100 and the completion time point of FTM execution. Each of the APs 300a and 300b transmits the acquired terminal information to the management server 200 (S120 and S125). At this time, it is assumed that the APs 300a and 300b have a reliable connection structure with the management server 200 or are installed at a safety area.

On the other hand, since the terminal 100 sequentially executes the FTM protocol with the APs 300a and 300b, the time points at which the management server 200 receives the terminal information from the APs 300a and 300b have a fine time difference.

In an embodiment of the present disclosure, the time difference in such a multiple AP negotiation process is managed and utilized for wireless LAN access control. That is, on the basis of the reception time points of the terminal information from the APs 300a and 300b, the management server 200 issues and manages a token for opening a wireless LAN data channel of each of the APs 300a and 300b.

Specifically, the management server 200 writes and stores the reception time points of the terminal information transmitted from the APs 300a and 300b, in order to control wireless LAN access managed based on the SSID. That is, when the APs 300a and 300b in the list of the APs 300a and 300b to participate in the multiple AP negotiation process transmit terminal information having executed the multiple AP negotiation, the management server 200 writes and stores the reception time points of the terminal information transmitted from the APs 300a and 300b (S130 and S135).

Then, the management server 200 compares the written reception time points with the completion time points of FTM execution included in the terminal information, and determines whether the terminal information has been transmitted from the APs 300a and 300b within a preset first time, that is, the APs 300a and 300b have transmitted the terminal information immediately after the FTM protocol is executed.

Furthermore, for each of the APs 300a and 300b having participated in the multiple AP negotiation process, the management server 200 determines whether an interval between the reception time points of the terminal information transmitted from the APs 300a and 300b is within a preset second time.

Such two determination processes may be determined by policy on the assumption that the terminal 100 has typically performed the multiple AP negotiation process. The core of the multiple AP negotiation process is for allowing the terminal 100 to access the wireless LAN only when the terminal 100 exists in a specific area. Therefore, when the terminal information and the interval do not satisfy the first time and the second time in the aforementioned determination processes, respectively, it may be determined that the terminal 100 is out of the overlapping area of the APs, and the wireless LAN access control function, in which the overlapping area of the APs is operated as a specific security area, may not be satisfied.

However, when it is determined that the terminal information and the interval satisfy the first time and the second time, respectively, the management server 200 issues tokens for opening a wireless LAN data channel of the terminal 100 to the APs 300a and 300b having participated in the multiple AP negotiation process (S140 and S145), and the APs 300a and 300b receive and store the issued token (S150 and S155). In an embodiment of the present disclosure, tokens issued for the APs 300a and 300b may be different tokens for the respective APs or the same tokens according to embodiments. That is, in an embodiment of the present disclosure, the same token may be issued to AP groups managed based on one SSID, and each AP may receive and store the same token, provide the same token for wireless LAN access to the terminal 100 having participated in the multiple AP negotiation process, verify the terminal 100, and allow access of the terminal 100.

Furthermore, the management server 200 may issue tokens to all APs having participated in the multiple AP negotiation process, and each AP may receive and store the token. Alternatively, according to policy (according to embodiment), the management server 200 may issue the same token to APs that are managed based on the same SSID but have not participated in the multiple AP negotiation process Furthermore, according to policy (according to embodiment), even though the multiple AP negotiation process of the terminal 100 is completed, token-based wireless LAN access may be allowed for APs of a first group, but may not be allowed for APs of a second group, among a plurality of APs managed based on the same SSID.

After performing the multiple AP negotiation process, the terminal 100 attempts to be authenticated by the management server 200 through a predetermined wireless LAN authentication method for wireless LAN access (S165). The management server 200 authenticates the terminal 100 on the basis of the predetermined wireless LAN authentication method (S170).

Even though the authentication of the terminal 100 is successful, the AP to be accessed does not open a wireless LAN data channel of the terminal 100. That is, the AP to be accessed opens the wireless LAN data channel only when it is checked that the terminal 100 has the same token issued by the management server 200.

To this end, as the authentication is successful, the terminal 100 requests the management server 200 to issue a token for opening a wireless LAN data channel to the AP to be accessed (S175), and receives the requested token from the management server 200 (S180).

The terminal 100 transmits an access request for a wireless LAN data channel to the AP to be accessed by using the token received from the management server 200 (S185). Upon receiving the access request, the AP to be accessed checks whether the token of the terminal 100 is the same as that received from the management server 200, and opens a wireless LAN data channel when the check result is valid (S190).

In such a case, since the corresponding token is issued once, the terminal 100 may access a wireless LAN data channel without going through a multiple AP negotiation process on the basis of the corresponding token. For example, when the terminal 100 leaves a coverage area after a token is issued and is located within the coverage area again, or when the terminal 100 moves and accesses a second AP to be accessed different from a first AP to be accessed, an 802.1x authentication process may be automatically performed. When the authentication is successful again, the terminal 100 may access a wireless LAN data channel of the first or second AP to be accessed on the basis of the previously issued token.

In the above description, steps S105, S110, S115, S120, S125, S130, S135, S140, S145, S150, S155, S160, S165, S170, S175, S180, S185, and S190 may be further divided into additional steps or combined into fewer steps according to an implementation example of the present disclosure. Furthermore, some steps may be omitted as needed, or the order of the steps may be changed. The contents described with reference to FIG. 2 and FIG. 3 may be applied to the method for providing wireless LAN security policy, which is described with reference to FIG. 4.

The method for providing wireless LAN security policy in accordance with the above-described embodiment of the present disclosure may be implemented as a program (or application) and stored in a medium, so as to be executed through a computer as hardware which is coupled thereto.

The above-described program may include codes written by a computer language such as C, C++, JAVA, Ruby or machine language, which can be read by a processor (CPU) of the computer through a device interface of the computer, in order to execute the above-described methods which are implemented as a program read by the computer. Such codes may include a functional code related to a function defining functions required for executing the above-described methods, and include an execution procedure-related control code required for the processor of the computer to execute the functions according to a predetermined procedure. Furthermore, such codes may further include additional information required for the processor of the computer to execute the functions or a memory reference-related code indicating the position (address) of an internal or external memory of the computer, where a medium needs to be referred to. Furthermore, when the processor of the computer needs to communicate with another remote computer or server in order to execute the functions, the codes may further include communication-related codes indicating how to communicate with another remote computer or server by using a communication module of the computer and which information or media to transmit or receive during communication.

The stored medium does not indicate a medium such as a register, cache or memory, which stores data for a short moment, but indicates a medium which semi-permanently stores data and can be read by a device. Specifically, examples of the storage medium include a ROM, RAM, CD-ROM, magnetic tape, floppy disk, optical data storage device and the like, but are not limited thereto. That is, the program may be stored in various recording media on various servers which the computer can access or various recording media of a user's computer. Furthermore, the media may store codes which can be distributed in computer systems connected through a network, and read by computers in a distributed manner.

The descriptions of the present disclosure are only examples, and those skilled in the art to which the present disclosure pertains will understand that the present disclosure can be easily modified into other specific forms without changing the technical spirit or essential features of the present disclosure. Therefore, it should be understood that the above-described embodiments are only illustrative in all aspects and are not limitative. For example, components described in a singular form may be distributed and embodied. Similarly, distributed components may be embodied in a coupled form.

The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A terminal for applying wireless local area network (LAN) security policy by participating in multiple access points (APs), the terminal comprising:
a communication module configured to transmit/receive data to/from multiple APs having overlapping coverage areas and a management server that manages the multiple APs;
a memory configured to store a program for wireless access to any one of the multiple APs; and
a processor configured to scan broadcasting information of the multiple APs to acquire radio frequency information and network identification information of the multiple APs, by executing the program stored in the memory, to measure distances from the multiple APs, and to wirelessly access an AP to be accessed located at a shortest distance,
wherein when a token requested for opening a wireless LAN data channel to the AP to be accessed is received through the management server, the processor requests access to the wireless LAN data channel of the AP to be accessed, on the basis of the received token;
wherein the management server compares reception time points of terminal information transmitted from the multiple APs with completion time points of a fine timing measurement (FTM) protocol execution that calculates information on distances between the terminal and the multiple APs; and
wherein the management server issues the token for opening the wireless LAN data channel to each of the multiple APs based on the comparing.

2. The terminal of claim 1, wherein the processor acquires radio frequency information and network identification information of multiple APs including SSIDs of neighboring APs and an MAC address, channel information, bandwidth information, and signal strength of an AP belonging to the SSID.

3. The terminal of claim 1, wherein
the terminal information includes a MAC address of a terminal acquired through the FTM protocol and a completion time point of the FTM protocol execution.

4. The terminal of claim 3, wherein the token is issued on the basis of a time point when the management server receives the terminal information from each of the multiple APs.

5. The terminal of claim 3, wherein the management server writes and stores the reception time points, and stores the issued tokens when the terminal information is transmitted from the multiple APs within a preset first time.

6. The terminal of claim 5, wherein when an interval between the reception time points of the terminal information transmitted from the multiple APs is within a preset second time, the management server issues the token for opening the wireless LAN data channel to each of the multiple AP and stores the issued tokens.

7. A management server for providing wireless local area network (LAN) security policy by participating in multiple access points (APs), the management server comprising:
a communication module configured to transmit/receive data to/from multiple APs having overlapping coverage areas and a terminal for wirelessly accessing any one of the multiple APs;
a memory configured to store a control program for wireless access of the terminal to any one of the multiple APs; and
a processor configured to issue and store a token for opening a wireless LAN data channel to each of the multiple APs on the basis of reception time points of terminal information transmitted from the multiple APs, by executing the program stored in the memory, and to, upon receiving a token request for opening a wireless LAN data channel to an AP to be accessed, selected by a terminal among the multiple APs, distribute, to the terminal, a token of the AP to be accessed corresponding to the token request,
wherein the terminal requests access to a wireless LAN data channel of the AP to be accessed, on the basis of the token;
wherein the processor compares the reception times points with completion time points of an FTM protocol execution that calculates information on distance information between the terminal and each of the multiple APs; and wherein the processor issues the token for opening the wireless LAN data channel to each of the multiple APs based on the comparing.

8. The management server of claim 7, wherein the communication module sequentially receives terminal information from each of the multiple APs, each of the multiple APs sequentially executes the FTM protocol between the terminal and each of the multiple APs, and the terminal information includes a MAC address of a terminal acquired through the FTM protocol and a completion time point of the FTM protocol execution.

9. The management server of claim 8, wherein the processor writes and stores the reception time points and stores the issued tokens when the terminal information is transmitted from the multiple APs within a preset first time.

10. The management server of claim 9, wherein when an interval between the reception time points of the terminal information transmitted from the multiple APs is within a preset second time, the management server issues the token for opening the wireless LAN data channel to each of the multiple AP and stores the issued tokens.

11. The management server of claim 9, wherein the management server authenticates the terminal on the basis of a predetermined wireless LAN authentication method, and distributes the token to the authenticated terminal.

12. A method in which a management server provides wireless local area network (LAN) security policy by participating in multiple access points (APs), the method comprising:

a step of receiving terminal information of a terminal, which is acquired in a process of scanning broadcasting information of multiple APs, from each of the multiple APs;

a step of issuing and storing a token for opening a wireless LAN data channel to each of the multiple APs on the basis of reception time points of the terminal information;

a step of receiving a token request for opening a wireless LAN data channel to an AP to be accessed, selected by a terminal among the multiple APs; and a step of distributing, to the terminal, a token of the AP to be accessed corresponding to the token request;

wherein the management server compares reception time points of terminal information transmitted from the multiple APs with completion time points of a fine timing measurement (FTM) protocol execution that calculates information on distances between the terminal and the multiple APs; and wherein the management server issues the token for opening the wireless LAN data channel to each of the multiple APs based on the comparing.

\* \* \* \* \*